UNITED STATES PATENT OFFICE.

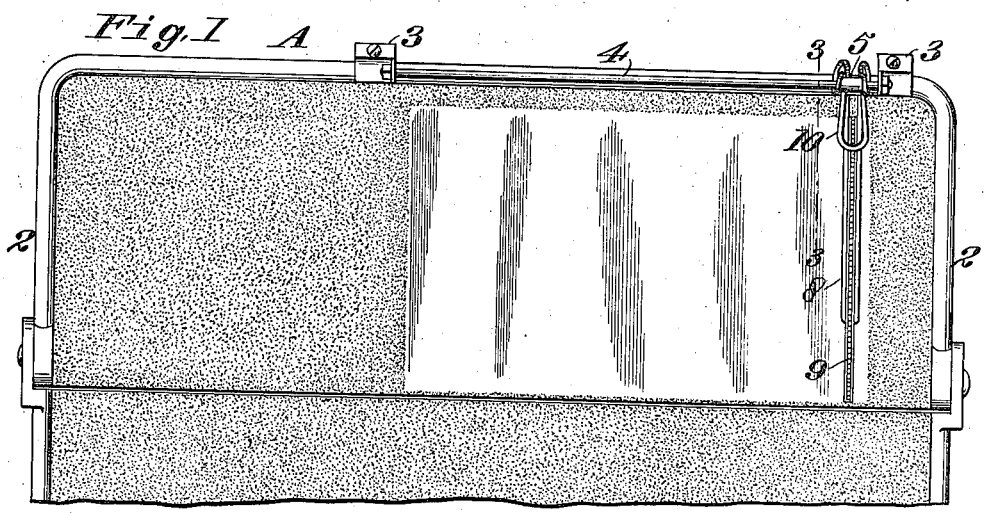
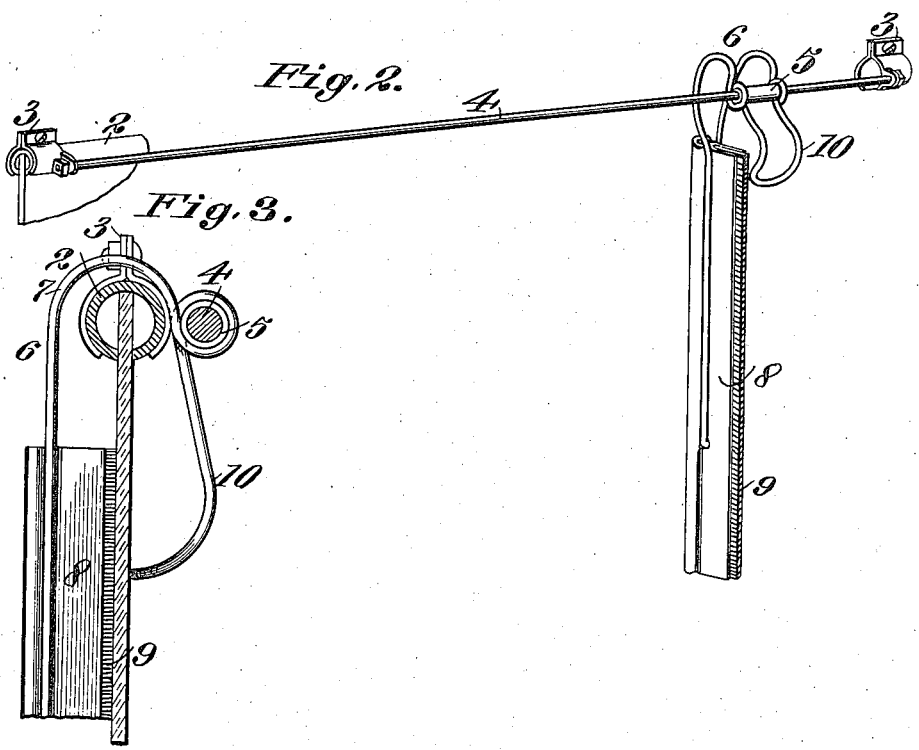

JOSEPH H. KING, OF OAKLAND, CALIFORNIA.

WINDOW-WIPER.

1,195,362.  Specification of Letters Patent.  Patented Aug. 22, 1916.

Application filed December 29, 1914. Serial No. 879,457.

*To all whom it may concern:*

Be it known that I, JOSEPH H. KING, a citizen of the United States, residing at Oakland, in the county of Alameda and State of California, have invented new and useful Improvements in Window-Wipers, of which the following is a specification.

This invention relates to a window wiper.

The object of the present invention is to provide a simple, easily operated device by which the thin film of fog, rain or snow-sleet collecting on a window surface during certain weather conditions may be removed, the device being particularly applicable to wind shields on automobiles, cab windows on locomotives or electric street cars, and the like.

The invention consists of the parts and the construction and combination of parts as hereinafter more fully described and claimed, having reference to the accompanying drawings, in which—

Figure 1 is a front view of an automobile wind shield showing the application of the invention. Fig. 2 is a perspective view of the device. Fig. 3 is a cross section on line 3—3, Fig. 1.

A indicates in general the glass section of a wind shield such as is ordinarily used on automobiles and 2 the frame in which the glass is mounted. Suitably secured on the inner side of said frame, by means of screw clamps 3, is a guide rod 4 on which is slidably mounted a sleeve member 5, and secured to or mounted on the sleeve is a spring wire frame 6. The wire frame is so shaped as to straddle the frame of the wind shield, as indicated at 7. One section of the wire frame is extended down on the exterior side of the shield to form a holder for the wiper 8, which consists of a metal clip in which is secured a strip of rubber, felt or the like 9, while the other section, which is wound around sleeve 5, is bent to form a handle or grip 10 by which the device as a whole may be moved back and forth across the surface of the shield.

The wire frame as a whole is preferably constructed of spring wire. The portion of the frame which straddles the wind shield will thus act as a spring arm which will hold the wiper arm in contact with the glass surface at all times. The clip or wiper is pivotally mounted between the arms 7 of the wire frame, thus permitting the whole edge of the wiper to bear against the window surface with equal pressure. An obstructive film, as far as vision is concerned, caused by fog, rain or sleet, may in this instance be easily removed without any inconvenience to the driver of the car, as it will only be necessary to reach over and slide the wiper across the glass once or twice. Accidents can, by the use of this device, to a large extent be avoided as a clear vision can easily be maintained at all times.

The materials and finish of the several parts of the device are such as the experience and judgment of the manufacturer may dictate.

I wish it understood that various changes in form, proportions, and minor details of construction may be resorted to within the scope of the appended claims and that I do not wish to limit myself to the specific design and construction here shown.

Having thus described my invention, what I claim and desire to secure by Letters Patent is—

1. The combination with the wind shield of an automobile, of a guide rod mounted thereon, a spring frame slidably carried by said guide rod, said frame comprising a pair of downwardly extending spring arms, a coil in said frame forming a bearing for a sleeve mounted to slide on said rod, and a handle formed integral with said coil, said coil forming a resilient connection between the handle and the spring arms.

2. The combination with the wind shield of an automobile, of a guide rod mounted thereon, a spring frame slidably carried by said guide rod, said frame comprising a pair of downwardly extending spring arms, a cleaner pivotally mounted between said arms, a coil in said frame forming a bearing for a sleeve mounted to slide on said rod, and a handle formed integral with said coil, said coil forming a resilient connection between the handle and cleaner for yieldingly holding the cleaner in contact with the wind shield.

In testimony whereof I have hereunto set my hand in the presence of two subscribing witnesses.

JOSEPH H. KING.

Witnesses:
OLAF J. HANSSEN,
O. RUSSELL.